No. 837,033. PATENTED NOV. 27, 1906.
P. BUNET.
COOLING DYNAMO ELECTRIC MACHINES.
APPLICATION FILED MAR. 23, 1905.
2 SHEETS—SHEET 1.
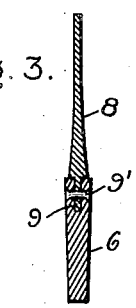
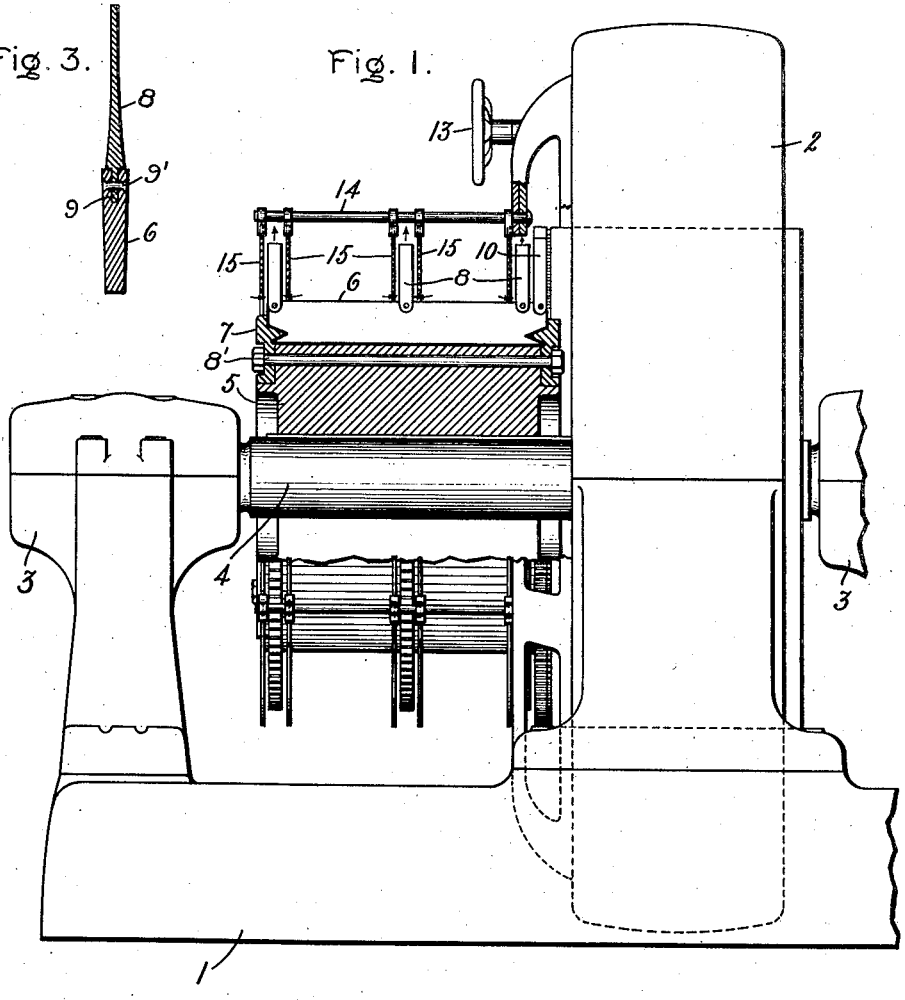
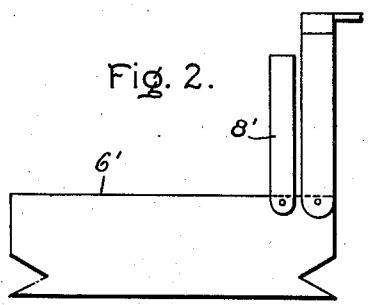
Witnesses:
Inventor:
Paul Bunet,
by Albert G. Davis
Att'y.

No. 837,033. PATENTED NOV. 27, 1906.
P. BUNET.
COOLING DYNAMO ELECTRIC MACHINES.
APPLICATION FILED MAR. 23, 1905.

2 SHEETS—SHEET 2.

Witnesses:

Inventor:
Paul Bunet,
by Albert G. Davis
Att'y.

UNITED STATES PATENT OFFICE.

PAUL BUNET, OF PARIS, FRANCE, ASSIGNOR TO GENERAL ELECTRIC COMPANY, A CORPORATION OF NEW YORK.

COOLING DYNAMO-ELECTRIC MACHINES.

No. 837,033.    Specification of Letters Patent.    Patented Nov. 27, 1906.

Application filed March 23, 1905. Serial No. 251,576.

*To all whom it may concern:*

Be it known that I, PAUL BUNET, a citizen of France, residing at Paris, France, have invented certain new and useful Improvements in Cooling Dynamo-Electric Machines, of which the following is a specification.

My present invention relates to means for cooling dynamo-electric machines, and especially to means for cooling the conductors thereof, such as the commutator-bars and the like.

In carrying out my invention I provide the conductors to be cooled with projections, preferably formed of a metal which is a good heat-conductor. The projections provided serve to materially increase the heat-radiating capacity of conductors from which they extend. When the conductors are mounted on a movable portion of the machine, as is the ordinary case with commutator-bars, I prefer to form the projections so that they serve as fan-blades or vanes to generate currents of air, which serve to still further cool the conductors.

The various features of novelty which characterize my invention are pointed out with particularity in the claims annexed to and forming a part of this specification.

For a better understanding of my invention, however, reference may be had to the accompanying drawings and descriptive matter, in which I have illustrated and described forms in which my invention may be embodied.

Figure 4:
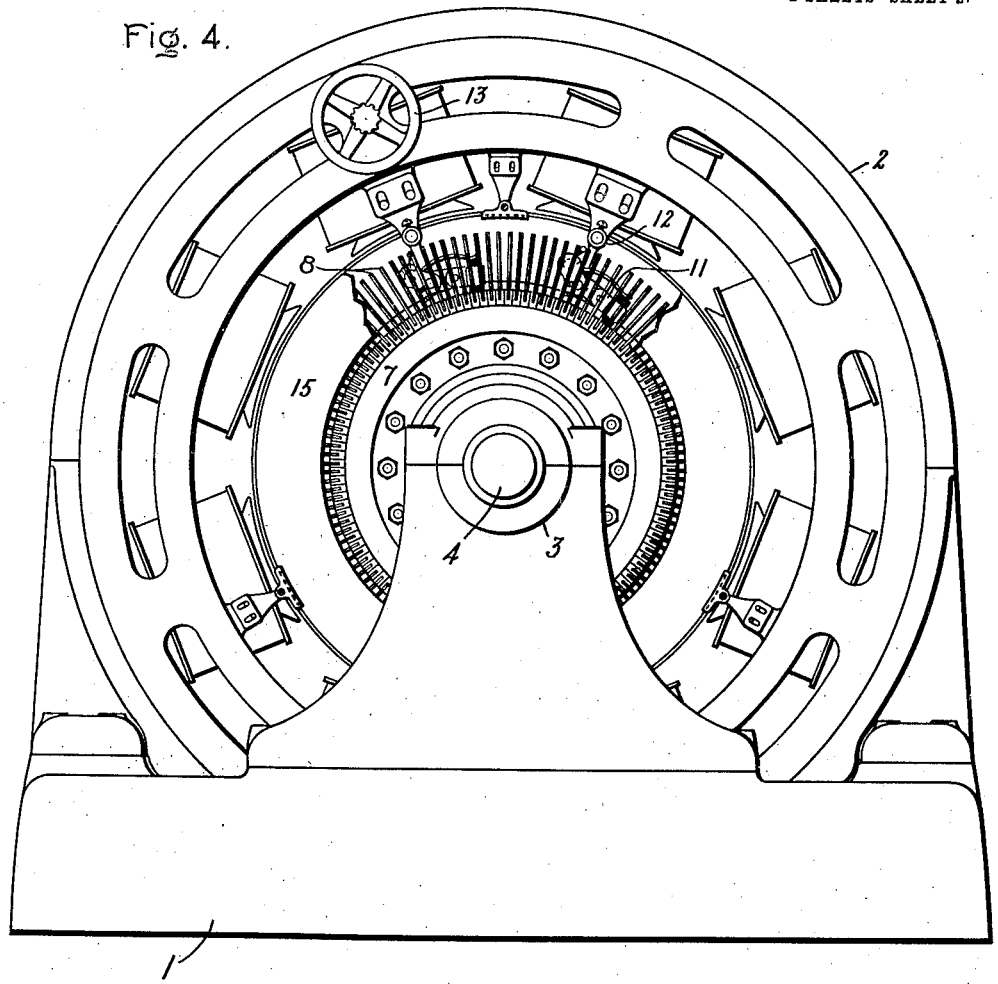
Figure 5:
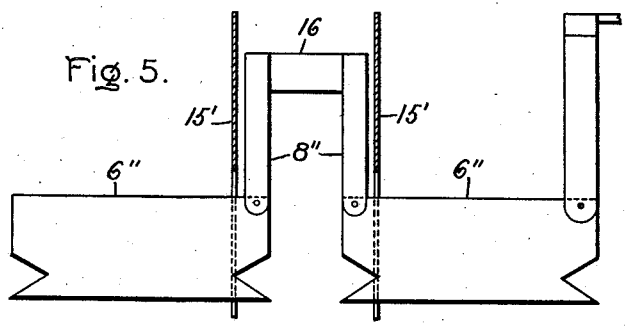

Referring to the drawings, Figure 1 is an elevation of a dynamo-electric machine embodying my invention with parts broken away and in section. Fig. 2 is an elevation of a commutator-bar and projection employed in a modified construction. Fig. 3 is a section of a commutator-bar and one form of attached projection. Fig. 4 is an end elevation of the construction shown in Fig. 1; and Fig. 5 is a view similar to Fig. 2, showing another modification.

In the drawings, 1 represents the base of a dynamo-electric machine, on which is mounted a field-ring 2 and pillow-blocks 3, in which is journaled a shaft 4, carrying the armature of the machine. At one end of the shaft 4 is mounted the usual commutator-shell 5, on the outer surface of which are secured suitably-insulated commutator-bars 6. The bars 6, which extend parallel to the axis of the shaft 4, are clamped between end clamping members 7, engaging the ends of the shell 5 and connected together by bolts 8'. The commutator-bars 6 may be of the usual form with the exception that to the upper side of some or all of the commutator-bars radial projections 8 are secured.

In the construction shown in Figs. 1 and 3 the projections are arranged in three sets, one set extending from each end of the bars and a set midway between the ends of the bars. The projections 8 may be integral with the bars 6, though ordinarily they are separate pieces rigidly secured thereto. In Fig. 3 of the drawings I have shown a construction in which the lower end of the body of the projection 8 is slightly less in thickness than the upper surface of the commutator-bar to which it is secured. The extreme lower end of the projection 8 is reduced to form a tenon 9, which sets into a socket or recess formed to receive it in the upper side of the commutator-bar and is secured in place by a transverse pin 9'. In addition to the pin 9' the commutator-bars and the projections may be connected by soldering. In some cases the pin may be dispensed with. The conductors 10, connecting the commutator-bars to the armature-winding, may be secured to the commutator-bars in the same manner as are the projections 8.

Instead of the construction shown in Fig. 3 I may make the body of the projection of the same thickness as the portion entering the socket in the commutator-bar. This is the construction shown in Fig. 2.

In the construction shown in Figs. 1 and 4 the brushes 11, coöperating with the commutator-bars, are carried in the usual manner from an annular support or yoke 12, which is secured against the field-ring 2 in the usual manner and with reference to which it may be angularly adjusted by a rack and pinion operated by the usual hand-wheel 13. Rods or posts carried by the yoke 12 extend parallel to the shaft 4 at various points about the commutator. These posts 14 are employed to support a number of annular shields or members 15, which may be formed out of sheet metal or other suitable material. In the construction shown in Figs. 1 and 4 a pair of shields 15 are placed one at each side of the left-hand set of projections 8, one at each side of the central set of projections 8 and one to the left of the right-hand set of projections 8. The diameter of the opening in each shield 15 is slightly greater than the internal diameter of the commutator, so that the annular space is formed between the surface of the commutator and the inner peripheries of the guide-rings. When the machine is in operation, the rotation of the commutator causes the projections 8 to generate air-currents which flow into the chimney-space or fan-casings formed by the two pairs of disks 15 and by the right-hand disk 15 and the adjacent end of the armature from along the commutator in the directions indicated by the arrows. The air is discharged from these chimney-spaces or fan-casings at the outer periphery of the guards. With this arrangement the commutator is cooled not only by reason of the good air circulation maintained, but because of the fact that the projections 8, which are preferably formed of metal—such as copper, brass, or the like, having a good heat conductivity—serve to carry heat away from the commutator-bars by conduction. The projections thus very materially increase the heat-radiating capacity of the commutator. If desired, the projections 8, arranged in the manner described, may be proportioned to produce a surface from which the heat from each commutator-bar is radiated several times greater than that of the heat-radiating surface in the ordinary arrangement. The increased heat-dissipating capacity thus obtained is highly important, as the disposition of the heat generated by the friction of the brushes, the sparking between the brushes and the commutator-bars, and the currents carried is frequently the limiting factor in the output of the machine. By the use of these projections in some cases other materials than copper may sometimes be used for commutator-bars.

In the construction shown in Fig. 2 the commutator-bars 6' are provided with only one set of heat-radiating projections 8', and the guards 15 are dispensed with. This arrangement of course possesses some of the advantages of the construction shown in Fig. 1 and Fig. 3 and is simpler.

In the construction shown in Fig. 5 the commutator-bars 6'' are divided, so that, in effect, two commutators placed end to end are formed. Heat-radiating and fan-blade projections 8'' are secured to the ends of the bars of the two commutators adjacent each other. Blades 16, extending parallel to the shaft, are employed to connect the outer ends of adjacent extensions 8''. Shield members 15', which may be similar to and be supported in the same manner as the shields 15 in the construction shown in Figs. 1 and 4, are placed at opposite sides of the vanes formed by blades 16 and the projections 8'', to which they are secured. It will be seen that by suitable proportioning of the parts shown in this construction a very powerful draft can be maintained through the chimney-spaces formed between the shields 15'.

It will be obvious to all those skilled in the art that many changes may be made in the forms in which my invention is shown without departing from the spirit of my invention. For instance, the numbers of projections secured to each commutator-bar may be varied, and the projections may be changed in configuration, and various means may be employed for securing the projections to the bars. It will also be obvious that in some cases only a portion of the commutator-bars in a commutator need be supplied with heat-radiating projections.

While I have hereinbefore described and illustrated the best forms of my invention now known to me, I do not wish the claims hereinafter made to be limited by the particular construction illustrated more than is made necessary by the state of the art.

What I claim as new, and desire to secure by Letters Patent of the United States, is—

1. In a dynamo-electric machine, a commutator the bars of which are provided with heat-radiating projections and a fan-casing inclosing said projections.

2. In a dynamo-electric machine, a rotating commutator provided with commutator-bars which extend parallel to the axis of rotation, heat-radiating projections secured to the commutator-bars, and an annular member surrounding the commutator and serving to direct the air-currents set in motion by said projections.

3. In a dynamo-electric machine, a rotating commutator comprising commutator-bars having fan-blades connected to them, and a pair of annular members surrounding said commutator and arranged one at each side of said fan-blades.

4. In a dynamo-electric machine, a rotating commutator comprising commutator-bars having fan-blades connected to them, and a pair of annular members surrounding said commutator and arranged one at each side of said fan-blades, said annular members being separated from the surface of the commutator by spaces through which air may be drawn by the fan-blades.

5. In a dynamo-electric machine, a rotating commutator comprising commutator-bars extending parallel to the axis of rotation and provided with heat-radiating projections, and a fan-casing inclosing said projections.

6. In a dynamo-electric machine, a rotating commutator comprising conductors or bars insulated from each other, and metal heat-radiating projections in the form of radial bars, the inner ends of which are secured to said conductors or bars and the outer ends of which are free.

7. In a dynamo-electric machine, a rotating commutator comprising a plurality of bars or conductors arranged parallel to the axis of rotation, said bars having radial projections or extensions arranged so that the bars rotate in the same plane transverse to the axis of rotation, and a fan-casing therefor comprising a pair of annular members surrounding the commutator and located one at each side of the projections.

8. In a dynamo-electric machine, a rotating commutator provided with commutator-bars extending parallel to the axis of rotation, one or more of said commutator-bars being provided with extensions or projections which serve to increase the heat-radiating capacity of the pair of bars to which they are attached, and a fan-casing surrounding said bars.

9. In combination, a commutator comprising commutator-bars having metallic fan-blades directly connected to them, and an annular member surrounding said commutator and located adjacent to one edge of each of said fan-blades, said member being separated from the surface of the commutator by a space or spaces through which air may be drawn by the fan-blades.

In witness whereof I have hereunto set my hand this 9th day of March, 1905.

PAUL BUNET.

Witnesses:
 WERNER HILDEBRAND,
 ARCHIBALD R. BAKER.